Sept. 11, 1956  H. F. FLOWERS  2,762,459
BRAKING MECHANISM FOR AN EIGHT WHEEL AXLELESS TRUCK CAR
Filed Oct. 24, 1950  3 Sheets-Sheet 1
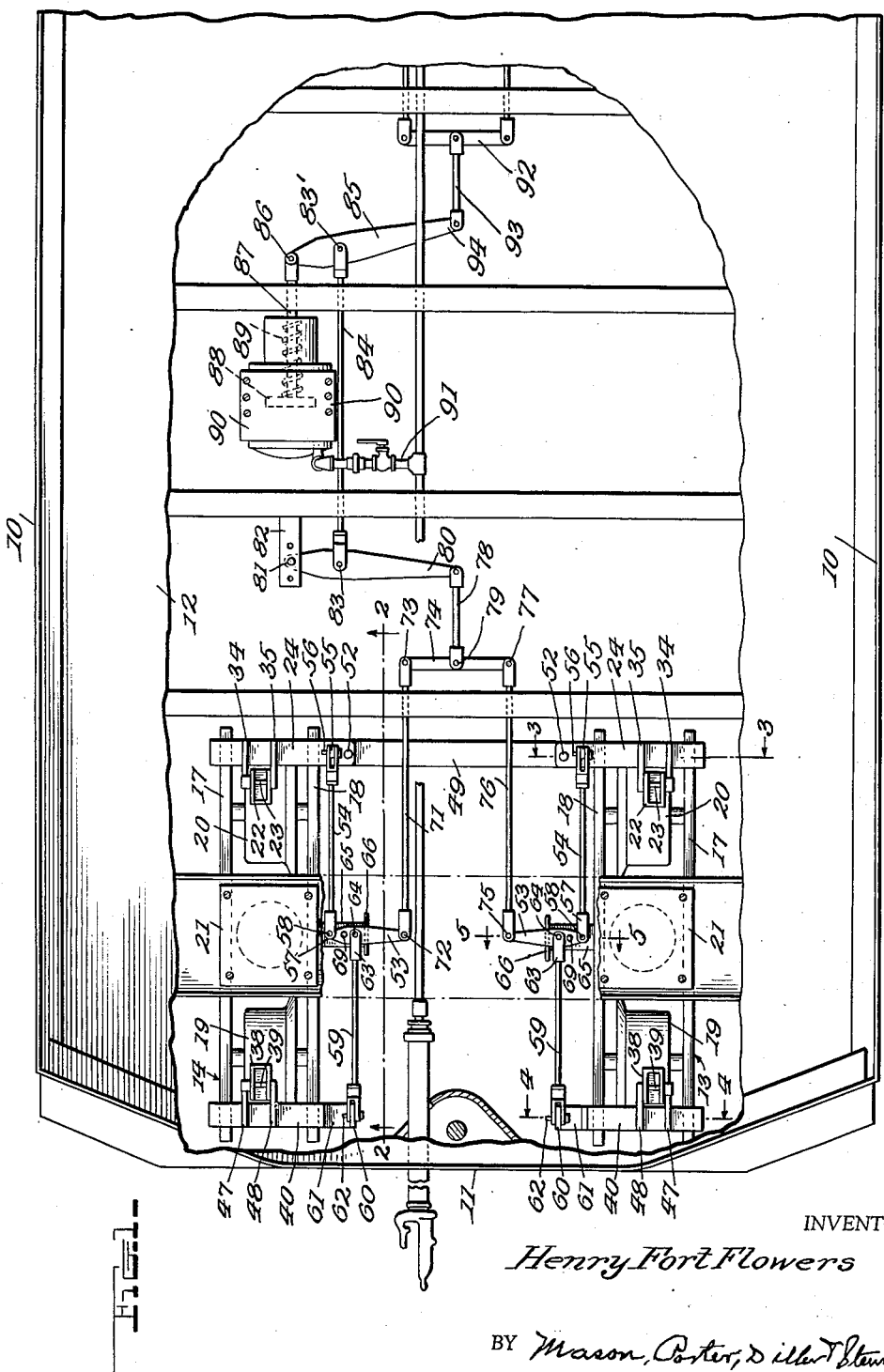
INVENTOR
*Henry Fort Flowers*
BY *Mason, Porter, Diller & Stewart*
ATTORNEYS

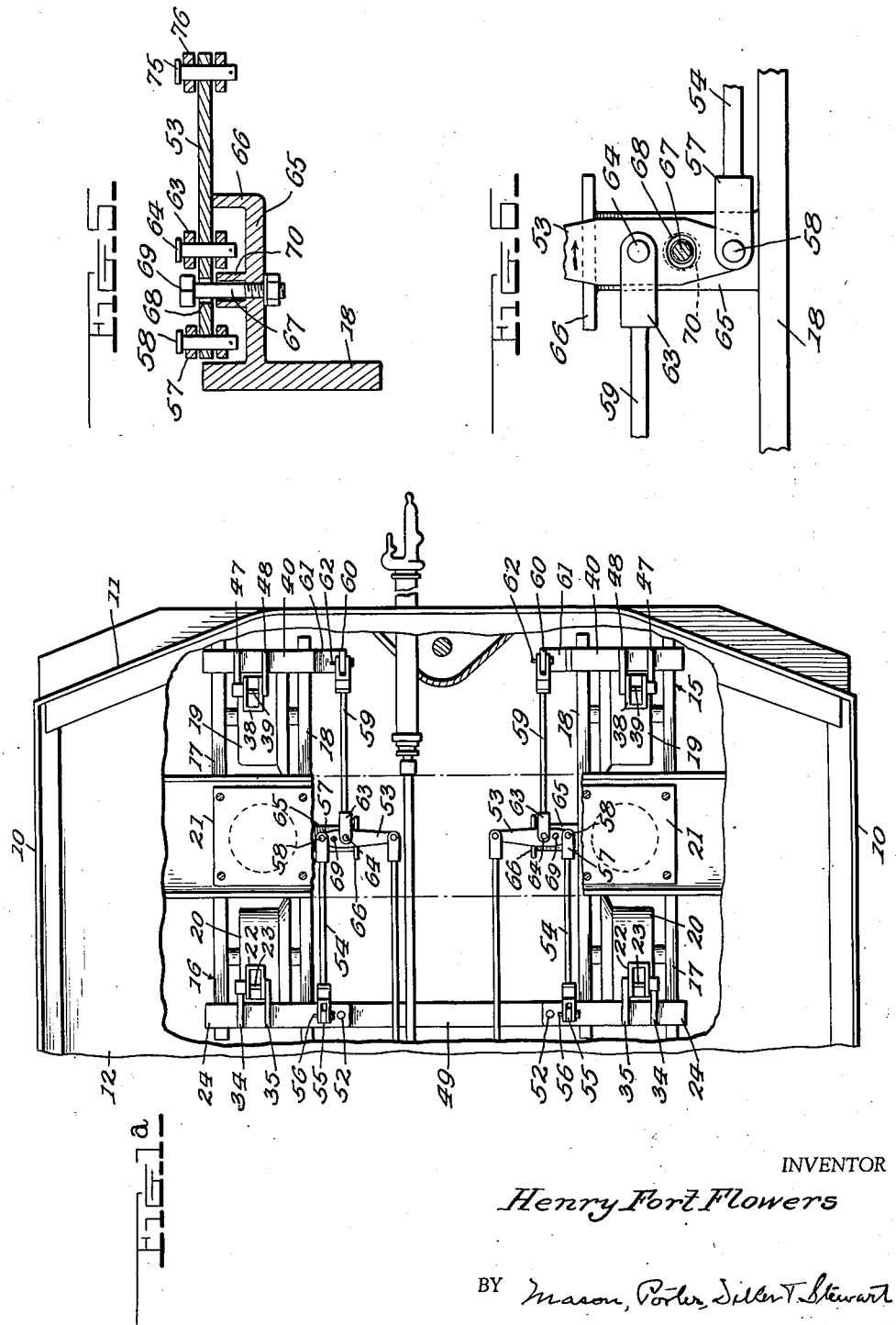

Sept. 11, 1956  H. F. FLOWERS  2,762,459
BRAKING MECHANISM FOR AN EIGHT WHEEL AXLELESS TRUCK CAR
Filed Oct. 24, 1950  3 Sheets-Sheet 3
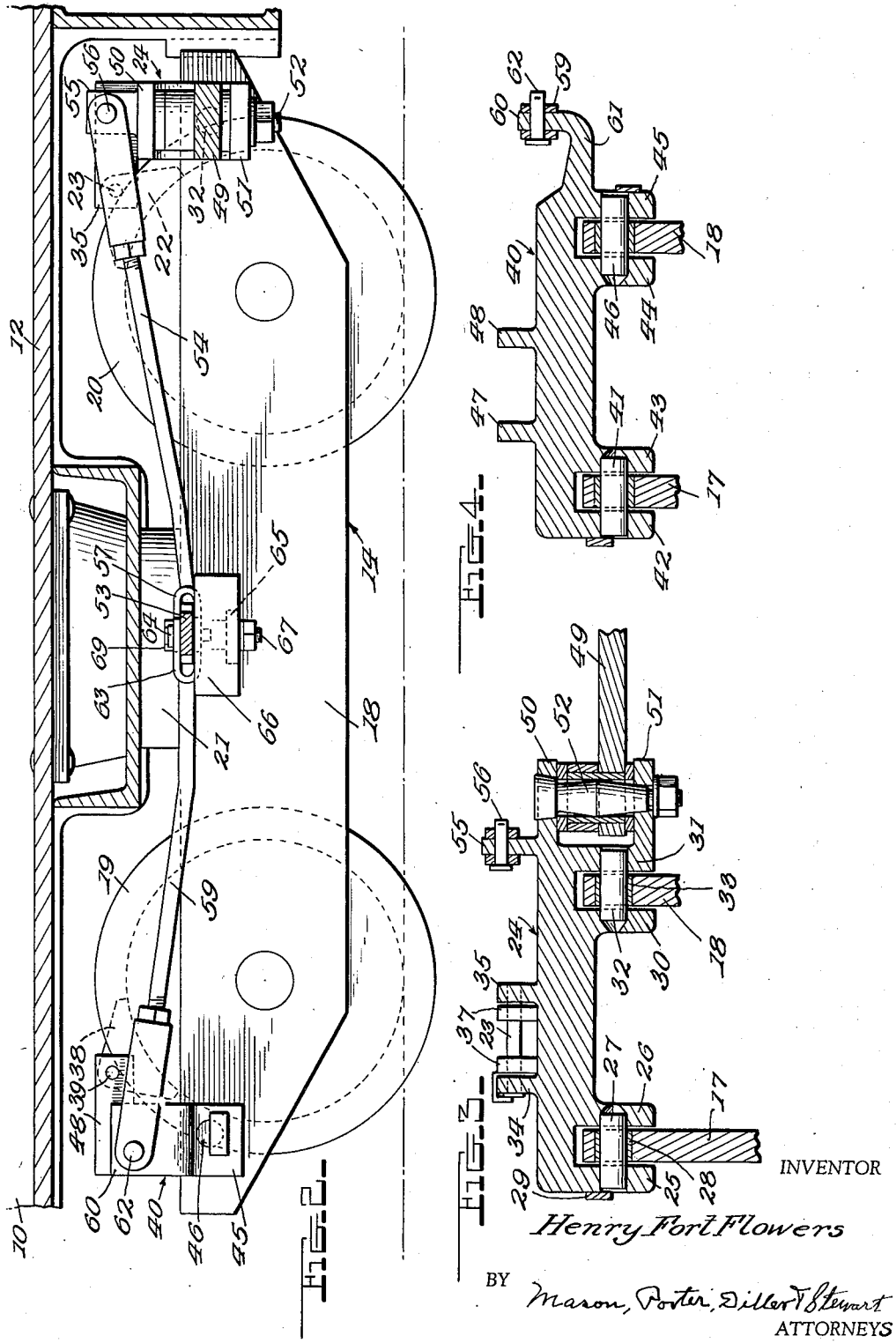
INVENTOR
*Henry Fort Flowers*
BY *Mason, Porter, Diller & Stewart*
ATTORNEYS

United States Patent Office 2,762,459
Patented Sept. 11, 1956

2,762,459

BRAKING MECHANISM FOR AN EIGHT WHEEL AXLELESS TRUCK CAR

Henry Fort Flowers, Findlay, Ohio

Application October 24, 1950, Serial No. 191,899

5 Claims. (Cl. 188—47)

The invention relates to new and useful improvements in a braking mechanism for an eight wheel axleless truck car.

An object of the invention is to provide a braking mechanism wherein there is a brake shoe associated with each wheel and wherein the braking force is divided among all of the shoes.

A further object of the invention is to provide a braking mechanism of the above type wherein the brake shoes on each truck are outside hung, permitting the wheels of the truck to be mounted close together.

A still further object of the invention is to provide a braking mechanism of the above type wherein the brake shoes and the brake operating rigging are disposed above the center line of the wheel axles, permitting the use of relatively small wheels without damaging the operating rigging in case of derailment.

A still further object of the invention is to provide a braking mechanism for a tandem wheel truck wherein a brake shoe associated with each wheel is moved into and out of operative position by a single truck brake lever; and Another object is to provide a braking mechanism of the above type wherein the truck brake lever is loosely pivoted to the truck frame with which it is associated so as to insure an effective braking action of one brake shoe if the other brake shoe or operating rod therefor is broken and also to prevent either brake shoe from dragging when the brakes are released.

These and other objects will in part be obvious and will in part be hereinafter more fully disclosed.

In the drawings:

Figure 1 is a top plan view of a portion of a car with the floor broken away to show the wheel mounting and the braking mechanism therefor;

Figure 1ᵃ is a top plan view of the other portion of a car with the floor broken away to show the wheel mounting and the braking mechanism therefor;

Figure 2 is a sectional view on the line 2—2 of Figure 1;

Figure 3 is a sectional view on the line 3—3 of Figure 1, showing only the brake shoe cage, the side members of the truck and a portion of the tie bar connecting opposed trucks;

Figure 4 is a sectional view on the line 4—4 of Figure 1;

Figure 5 is a sectional view on the line 5—5 of Figure 1, and

Figure 6 is a top plan view on the parts shown in Figure 5.

In my prior Patent No. 2,461,263, granted February 8, 1949, there is shown and described an eight wheel axleless rail vehicle and a braking mechanism therefor in which the wheels are mounted in tandem on trucks capable of vertical movement relative to the body, of turning about a vertical axis so as to follow curved tracks and oscillating about a horizontal axis.

The present improvement relates to an eight wheel tandem truck vehicle of the type illustrated in my prior patent. One of the important features of the present improvement is a braking mechanism which includes a brake shoe for each wheel and a brake applying mechanism having equalizers whereby the braking force is divided among the brake shoes on all eight wheels. Another feature is the mounting of the brake shoes on the outside of the wheels so that the wheels can be placed close together and a shorter wheel base truck produced which is much lighter for a given strength than a long wheel base truck. Another feature is the provision of a brake operating mechanism wherein the brake actuating lever associated with each truck has a loose hold down engagement with a bracket mounted on the truck frame so that if one brake shoe becomes ineffective to engage its wheel said lever will fulcrum on said bracket and apply braking force to the other shoe, said hold down connection to the bracket on the truck also operates to prevent either brake shoe, when the braking force is released, from dragging on its associated wheel.

The improvements will be better understood by a detailed description of the illustrated embodiment of the invention.

A portion of the vehicle body is illustrated in Figures 1, 1ᵃ and 2. It includes in general side members 10, 10, and end members, 11, 11. Between the side members and extending from one end of the vehicle to the other is a floor plate 12. This floor plate in Figures 1 and 1ᵃ is broken away to show the truck mounting and the braking mechanism embodying the present improvements. Figure 1 shows the opposed trucks 13 and 14 which are located adjacent one end of the vehicle and Figure 1ᵃ shows the opposed trucks 15 and 16 located at the other end of the vehicle. These trucks and the manner of mounting the same on the vehicle are similar in construction and a detailed description for one will serve for the others. Each truck frame includes side members 17 and 18 between which are mounted wheels 19 and 20. The truck frame between the wheels is provided with a body supporting member similar in construction to that illustrated in my prior Patent No. 2,461,263 supra. Attached to the floor plate 12 of the body is a king post 21 which extends into the body supporting member. The body support is so constructed that the body can move vertically relative to the truck and is supported on springs. The truck frame can oscillate about a vertical axis centrally of the king post and it can also oscillate about a horizontal axis passing centrally through the king post.

Associated with the wheel 20 is a brake shoe 22. This brake shoe is mounted on a pivot pin 23 carried by the brake carriage. The brake carriage includes a bar 24 which extends across the truck frame from one side thereof to the other, said bar has depending members 25 and 26 which are spaced from each other and these members extend down over the side faces of the side members 17 of the truck. A pivot pin 27 extends through a bushing 28 in the side frame 17 and engages openings in the members 25 and 26. A plate 29 welded to the brake bar prevents the pivot pin 27 from working out of place. The brake bar, at the other end thereof, is provided with depending members 30 and 31. These members are spaced so that they pass down on opposite sides of the truck frame 18. A pivot pin 32 is carried by the brake lever and extends through a bushing 33 in the side frame 18. The bar 24 of the brake carriage is also provided with upstanding members 34 and 35. These members project laterally from the brake bar and the brake shoe is pivotally mounted between said members. The pivot of the brake shoe is indicated at 23 and the flanges of the brake shoe are indicated at 37, 37 and the pivot pin passes through said flanges.

The pivot pins 32 and 27 are in alignment and serve as a pivotal support for the brake carriage. It is noted that this pivotal support for the brake carriage is well above the axle of the wheel 20. It is further noted that the brake shoe 22 is arranged above the brake carriage pivot point.

Associated with the wheel 19 is a brake shoe 38. This brake shoe is pivoted at 39 to a brake carriage 40 and the brake carriage 40 is in turn pivoted at 41 to the side frame 17 of the truck. In Figure 4 this brake carriage 40 is shown in detail and it includes a bar extending across from one side of the frame to the other, depending members 42 and 43 carried by the bar and which are pivoted to the side frame 17 by the pivot pin 41. The brake bar also including depending members 44 and 45 which are pivoted to the side member 18 of the truck frame by a pivot pin 46. The brake bar 40 also has spaced laterally projecting members 47 and 48 between which the brake shoe 38 is pivotally mounted by the pivot pin 39.

The opposed trucks are connected by a tie bar 49. The connections to the trucks are of similar construction. In Figure 3 the brake bar 24 is shown as having longitudinally extending members 50 and 51. The tie bar 49 is disposed between these members and is connected to the brake bar by a vertically arranged pivot pin 52. This pivot pin is so shaped as to provide a universal connection between the tie bar and the brake cage and enables the tie bar to move endwise and thus impart movements of one truck to the other without interfering with the independent movement of the trucks in vertical planes.

Associated with each truck is a truck brake lever 53. This truck brake lever is connected to the brake bar 24 by means of a brake rod 54. The brake bar 24 which is a part of the brake carriage has an upstanding lug 55 and the brake rod 54 has a forked end which straddles the lug and is attached thereto by a pivot pin 56. The brake rod 54 at its other end is also provided with a forked coupling head 57 and this head is attached to the lever 53 by a pivot pin 58. The lever 53 is connected to the brake bar 40 by means of a brake rod 59. This brake rod 59 has a forked end which straddles an upstanding lug 60 on a bracket 61 projecting longitudinally from the brake bar 40. The head of the brake rod 59 is secured to the lug by a pivot pin 62. The brake rod 59 at its other end has a forked head 63 which is pivoted at 64 to the lever 53.

Welded or otherwise secured to the side frame 18 of the truck is a bracket 65. This bracket at its outer end has an upturned member 66 which extends laterally from the bracket as indicated in Figure 1. The brake lever 53 normally rests on this upstanding member 56 and is free to move laterally thereon. Disposed between the pivots 58 and 64 is a hold down bolt 67. This bolt extends through an opening 68 in the lever which is slightly larger in diameter than the bolt. It projects a slight distance above the lever 53 and is provided with a head 69. Surrounding the bolt 67 is a sleeve 70. This sleeve rests on the bracket 65 and serves as an additional support on which the lever rests in its brake actuating movements. The head 69 is well above the lever but serves to hold the lever and the brake rigging attached thereto from tilting or flopping, so as to cause one or the other of the brake shoes to drag. The specific construction of the truck 14 opposed to the truck 13 and its braking mechanism is similar to that which has been described in connection with the truck 13 and some of the reference numerals referred to above have been applied thereto to indicate the several connected elements. The same is true of the opposed trucks at the other end of the car. The truck structure and the braking mechanism and also the tie bar connecting the trucks are all similar to that described above and again some of the reference numerals have been applied to similar parts to identify the same.

The brake lever 53 of the truck 14 is connected by a body rod 71. This body rod is pivoted to the outer end of the lever 53 by a pivotal connection 72. The body rod 71 is also pivoted at 73 to an equalizer bar 74. The lever 53 associated with the truck 13 is pivotally connected at 75 to a body rod 76 and this body rod 76 is pivoted at 77 to the equalizer bar 74. Another body rod 78 is pivoted centrally of the equalizer bar 74 as indicated at 79 and this body rod 78 is connected to a lever 80 which is fulcrumed at 81 on a bracket 82 carried by the body of the vehicle. The lever 80 is pivoted at 83 to a body rod 84 and this body rod 84 is pivotally connected at 83' to a lever 85 similar in purpose to the lever 80. The lever 85 is pivotally connected at 86 to the piston rod 87 which in turn is connected to the piston 88 operating in an air cylinder 90. The spring 89 moves the piston to the left as viewed in Figure 1 and air introduced into the cylinder through a pipe 91 forces the piston in the opposite direction. There is an equalizer bar 92 associated with the braking mechanism at the opposite end of the vehicle and this equalizer is pivotally connected by a link 93 to the outer end 94 of the lever 85.

When air is admitted to the cylinder 90, the piston 88 will be moved to the right and this will cause the lever 85 to swing in a clockwise direction and exert a pull upon the equalizing bar 92. Through the link 84 it will cause the lever 80 to move in a counterclockwise direction and this will cause a pull upon the equalizing bar 74. The equalizing bar 74 through the links 71 and 76 will exert an equal pull upon the levers 53 to which they are connected. The levers 53 will in turn through the body rods 54 and 59 exert an equal brake applying force to the brake shoes associated with the wheels 19 and 20. It will be noted, therefore, that when a braking force is applied to the braking rigging in the manner above described there is substantially an equal braking force applied to all of the eight wheels of the vehicle. The air cylinder 90 is attached to the underside of the floor plate and all of the operating levers and rods leading to the brakes are disposed well above the axles of the wheels. Therefore, a relatively small wheel for each truck may be used without fear of damaging the brake rigging in case of derailment.

It is further noted that the brake shoes on each wheel are outside hung and this permits the wheels to be mounted relatively close together. This has the advantage that a short wheel base truck can be made much lighter for a given strength than a long wheel base truck. The brake shoes being outside hung are self energizing so as to compensate for weight transfer effects when brakes are applied. The brake operating levers 53 are supported on a bracket carried by the truck frames with which they are associated. The bolt 67 projects through an opening in the lever which is of slightly greater diameter than the bolt so that during the normal operation of the braking lever the bolt 67 is free from contact with the side walls of the opening. This bolt is provided with a head 69 which overlies the brake lever 53. The brake lever is supported during its movements by the upstanding member 66 on the bracket 65 and also the sleeve 70. The head on the bolt holds the lever down so as to prevent the lever from tilting or flopping and thus causing the brake shoes to drag on the wheels. Furthermore, if the brake shoe becomes ineffective on one of the wheels due to a braking of some of the parts, the lever will move so that the side of the opening will contact with the bolt as a fulcrum and this enables a breaking force to be applied to the other brake shoe on the truck. When the air pressure is released the spring 89 will swing the levers 85 and 80 in the opposite direction and this will cause the brake shoes to be lifted from the wheels. If one of the brake shoes is not moved away from the wheel the lever will be moved by swinging so that the side of the opening will contact with the bolt 67 and this will force the brake shoe away from the wheel and thus insure that neither brake shoe will drag on the wheel when the braking force is released.

When the truck brake lever is pivotally mounted on the truck as described above, the two brake shoes in a truck will wear at the same rate. In other words, if one shoe wears to an extent that the lever 53 will move into contact with the bolt then the bolt becomes a fulcrum point so that greater pressure is applied to the brake shoe which has worn to a lesser extent and this will bring about a substantially equal rate of wear on the shoes. It is noted that the tie bar is connected to the brake bars of the opposed trucks and, therefore, the weight of the tie bar assists in holding the brakes released when the air pressure is released from the cylinder 90. In other words, the weight of the tie bar connected to the brake carriages tends to turn the brake carriages so as to release the brake shoes from the wheel. It is further noted that the braking force is applied centrally to each end pair of trucks so that there is no tendency to pull the truck to one side when the brakes are applied.

Means is provided whereby the fulcrum point of the lever 80 on the bracket 82 may be adjusted. Furthermore, the connections between the rods and the levers are of a character that they may be adjusted so that it is very easy to adjust the brake operating rigging so as to bring about a synchronized operation of the brake shoes and a substantially equal braking force applied to each shoe associated with the eight wheels of the trucks. It is noted that the brake operating rigging is in a large measure self supporting and, therefore, this greatly simplifies the braking mechanism.

The braking mechanism has been described in detail in connection with an eight wheel axis truck car. It is to be understood, however, that the braking mechanism may be applied to other types of eight wheel cars.

It is obvious that many changes may be made in the details of construction without departing from the spirit of invention as set forth in the appended claims.

I claim:

1. A braking mechanism for tandem wheel trucks comprising opposed truck frames at each end of the vehicle, a tie bar pivotally connecting said truck frames, each truck including wheels mounted in tandem thereon, a brake shoe for each wheel, a brake cage for each shoe, said brake cage being pivoted to said truck frame on an axis parallel to and a fixed distance from the axis of rotation of said wheel, a brake lever for each truck, brake rods pivotally connected to said lever at spaced points and pivotally connected to their respective brake cages for oscillating the same, a bracket carried by said truck frame on which said truck lever is supported, and a hold down bolt carried by said bracket and passing loosely through an opening in said lever for confining said lever to substantially horizontal movements during its brake applying movement, said lever operating free of the hold down bolt to apply substantially equal braking force to said shoes.

2. A braking mechanism for tandem wheel trucks comprising opposed truck frames at each end of the vehicle, a tie bar pivotally connecting said truck frame, each truck including wheels mounted in tandem thereon, a brake shoe for each wheel, a brake cage for each shoe, said brake cage being pivoted to said truck frame on an axis parallel to and a fixed distance from the axis of rotation of said wheel, a brake lever for each truck, brake rods pivotally connected to said lever at spaced points and pivotally connected to their respective brake cages for oscillating the same, and means carried by said truck frame and disposed close to said lever and between the brake rod connections thereto but normally out of contact with said lever so that said lever is free to apply substantially equal braking force to the brake shoes, said lever operating to contact said means when one brake shoe becomes ineffective to engage its wheel and serves as a fulcrum for said lever whereby said lever will apply normal braking force to the other shoe.

3. A braking mechanism for tandem wheel trucks comprising opposed truck frames at each end of the vehicle, a tie bar pivotally connecting said truck frame, each truck including wheels mounted in tandem thereon, a brake shoe for each wheel, a brake cage for each shoe, said brake cage being pivoted to said truck frame on an axis parallel to and a fixed distance from the axis of rotation of said wheel, a brake lever for each truck, brake rods pivotally connected to said lever at spaced points and pivotally connected to their respective brake cages for oscillating the same, a bracket carried by said truck frame on which said lever rests during its brake applying movements, said lever having an opening disposed between the pivotal connections of the brake rods to the lever, and a bolt carried by said bracket and passing loosely through said opening, said opening being dimensioned so that the lever is out of contact with said bolt during normal braking movements, and will apply equal braking force to the brake shoes, and so that said lever will contact with said bolt and fulcrum thereon and thus insure that both brake shoes will be lifted from engagement with the wheels when the brake applying force is released.

4. A braking mechanism for tandem wheel trucks comprising opposed truck frames at each end of the vehicle, a tie bar pivotally connecting said opposed truck frames, each truck frame including wheels mounted in tandem thereon for rotation independently of each other, a brake lever for each truck, brake rods pivotally connected to said lever at spaced points and pivotally connected to their respective brake cages, a bracket carried by said truck frame on which said lever rests during its brake applying movements, said lever having an opening disposed between the pivotal connections of the brake rods and a bolt carried by said bracket and passing loosely through said opening, said opening being dimensioned so that the lever is out of contact with the bolt during normal braking movements so that said brake rods are both placed under tension, and apply substantially equal braking force to the shoes, an equalizing bar associated with the opposed trucks, rods connecting the levers of opposed trucks to said equalizing bar, a fluid actuated piston and means connected thereto and to the equalizing bars for simultaneously applying equal braking force to said equalizing bars and from said equalizing bar to said brake operating levers on opposed trucks.

5. A braking mechanism for tandem wheel trucks comprising opposed truck frames at each end of the vehicle, a tie bar pivotally connecting said truck frames, each truck including wheels mounted in tandem thereon, a brake shoe for each wheel, a brake cage for each shoe, a brake lever for each truck, brake rods pivotally connected to said lever at spaced points and pivotally connected to their respective brake cages for oscillating the same, a bracket carried by said truck having an upturned end portion on which said lever freely rests, said lever having an opening disposed between the pivotal connections of the brake rods to the lever, a bolt carried by said bracket and extending upwardly through the opening in said lever, said opening being larger than the bolt and having a head overlying the opening, a sleeve surrounding a bolt and disposed beneath said lever, said opening in the lever being dimensioned and disposed so that the lever is out of contact with the shank of the bolt during normal braking movements, whereby said braking lever is confined to horizontal movements and during normal braking operations will fulcrum on one braking rod or the other until the braking forces applied to the brake shoes are equal.

References Cited in the file of this patent
UNITED STATES PATENTS

| | | |
|---|---|---|
| 472,965 | Fries et al. | Apr. 12, 1892 |
| 577,768 | Maechling | Feb. 23, 1897 |
| 601,896 | Lodriguss | Apr. 5, 1898 |
| 758,391 | Shelton | Apr. 26, 1904 |
| 1,442,890 | Laverdiere | Jan. 23, 1923 |
| 1,657,988 | Anderson | Jan. 31, 1928 |
| 1,738,485 | Sauvage | Dec. 3, 1929 |
| 1,963,224 | Browall | June 19, 1934 |